United States Patent
Kurt et al.

(10) Patent No.: US 7,646,869 B2
(45) Date of Patent: Jan. 12, 2010

(54) SYSTEM FOR COPY PROTECTION OF AN INFORMATION CARRIER

(75) Inventors: Ralph Kurt, Eindhoven (NL); Robert Frans Maria Hendriks, Eindhoven (NL); Levinus Pieter Bakker, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 587 days.

(21) Appl. No.: 10/554,599

(22) PCT Filed: Apr. 16, 2004

(86) PCT No.: PCT/IB2004/001255

§ 371 (c)(1),
(2), (4) Date: Oct. 27, 2005

(87) PCT Pub. No.: WO2004/097826

PCT Pub. Date: Nov. 11, 2004

(65) Prior Publication Data

US 2006/0281013 A1    Dec. 14, 2006

(30) Foreign Application Priority Data

Apr. 29, 2003    (EP) .................................. 03300009

(51) Int. Cl.
 *G09C 3/00*    (2006.01)
(52) U.S. Cl. .................... 380/54; 713/167; 380/201; 380/209
(58) Field of Classification Search .............. 380/54, 380/239, 240, 228–229, 201–209; 713/179, 713/167; 382/101–325; 360/281.9, 264, 360/274, 294; 369/86–92, 273–285; 359/2–3
See application file for complete search history.

(56) References Cited

U.S. PATENT DOCUMENTS

| | | | | |
|---|---|---|---|---|
| 3,711,829 | A * | 1/1973 | Lubrano | 714/800 |
| 3,929,398 | A * | 12/1975 | Bates | 356/416 |
| 5,461,239 | A * | 10/1995 | Atherton | 250/566 |
| 5,587,984 | A * | 12/1996 | Owa et al. | 369/103 |

(Continued)

FOREIGN PATENT DOCUMENTS

EP    0731459 A2    9/1996

(Continued)

OTHER PUBLICATIONS

Ravikanth, Pappu et al: Physical One-Way Functions, Science, American Association for the Advancement of Science, US, vol. 297, No. 5589, Sep. 2002, pp. 2026-2030, XP002285061.

(Continued)

*Primary Examiner*—Matthew B Smithers
*Assistant Examiner*—Abu Sholeman

(57) ABSTRACT

The present invention relates to a system for copy protection of an information carrier, said system comprising a diffractive layer for delivering a speckle pattern when illuminated by a light source, a spatial filter, which is aligned with respect to the diffractive layer, for delivering a filtered optical signal from the speckle pattern and a detector array for delivering, when illuminated by said filtered optical signal, an electrical signal. Said system further comprises means for computing a cryptographic key from the electrical signal, and means for decrypting encrypted data contained in the information carrier from the cryptographic key. It finds its application in copy protection of content carriers such as optical discs or in smart cards.

10 Claims, 2 Drawing Sheets

U.S. PATENT DOCUMENTS

| | | | |
|---|---|---|---|
| 6,028,935 | A | 2/2000 | Rarity et al. |
| 6,114,090 | A * | 9/2000 | Wu et al. .................. 430/281.1 |
| 6,278,671 | B1 * | 8/2001 | Gotoh et al. ............. 369/47.19 |
| 6,280,960 | B1 * | 8/2001 | Carr ........................... 435/7.2 |
| 6,379,849 | B1 * | 4/2002 | Lin et al. ....................... 430/5 |
| 6,828,080 | B2 * | 12/2004 | Nakao ........................ 430/311 |
| 6,938,267 | B2 * | 8/2005 | Kikuchi et al. .............. 720/718 |
| 7,095,484 | B1 * | 8/2006 | Fries ........................... 355/67 |
| 7,535,899 | B2 * | 5/2009 | Parmar et al. ............... 370/389 |
| 7,553,280 | B2 * | 6/2009 | Lesho ........................ 600/365 |
| 2002/0141583 | A1 | 10/2002 | Barnard et al. |
| 2002/0182547 | A1 * | 12/2002 | Raguin ....................... 430/322 |
| 2003/0118920 | A1 * | 6/2003 | Johnstone et al. .............. 430/5 |

FOREIGN PATENT DOCUMENTS

| | | |
|---|---|---|
| EP | 1102249 A1 | 5/2001 |
| EP | 1152402 A1 | 11/2001 |
| GB | 2428948 A | 2/2007 |
| WO | 9833325 A2 | 7/1998 |
| WO | WO 0014734 * | 3/2000 |
| WO | WO 0067257 * | 9/2000 |
| WO | 0067257 A2 | 11/2000 |
| WO | WO 0067257 * | 11/2000 |
| WO | 03049106 A2 | 6/2003 |
| WO | 2005048256 A2 | 5/2005 |
| WO | 2005086158 A1 | 9/2005 |
| WO | 2006046183 A1 | 5/2006 |

OTHER PUBLICATIONS

Ravikanth, Pappu S, Physical One-Way Functions, Mar. 2001, pp. 1-154, XP002286677, http://web.media.mit.edu.

Sean E. Shaheen, et al: "2.5% Efficient Organic Plastic Solar Cells", Applied Physics Letters, vol. 78, No. 6, Feb. 5, 2001, pp. 841-843.

E. Kymakis, et al: "Single-Wall Carbon Nanotube/Conjugated Polymer Photovoltaic Devices", Applied Physics Letters, vol. 80, No. 1, Jan. 7, 2002, pp. 112-114.

Garner, I.: "Amorphous Silicon for Photovoltaic Cell"; Communications International, vol. 16, No. 3, Mar. 1989, pp. 73-76.

* cited by examiner

SYSTEM FOR COPY PROTECTION OF AN INFORMATION CARRIER

FIELD OF THE INVENTION

The present invention relates to a system for copy protection of an information carrier.

The present invention also relates to an information carrier for use in such a system.

It relates to a method of and a device for reading such an information carrier.

It finally relates to a method of manufacturing a cryptographic key in hardware to prevent copying the information carrier in accordance with the invention.

It finds its application in copy protection of content carriers such as optical discs or in smart cards.

BACKGROUND OF THE INVENTION

Physical one-way functions have already been proposed as a basis for cryptography, copy protection or identification cards. According to the known prior art, a diffractive structure is illuminated with an arbitrary wave front, and the resulting speckle pattern is detected by a detector, for instance a CCD camera. From the speckle pattern a cryptographic key is created, which uniquely identifies the diffractive structure. The robustness of such a system depends strongly on the alignment between the diffractive structure and the detector.

The paper entitled "Physical one-way functions", Science, 20 Sep. 2002, p. 297 shows the use of diffractive structures for realizing one-way functions for cryptography purpose. Said paper is based on the detection of the speckle pattern by a high resolution CCD detector, which is rather expensive. And some problems can be expected from alignment between the light source, the diffractive structure and the detector.

SUMMARY OF THE INVENTION

It is an object of the invention to propose a system for copy protection of an information carrier that is less complex than the solution of the prior art while keeping an equivalent efficiency.

To this end, the system in accordance with the invention comprises:
 a diffractive layer for delivering a speckle pattern when illuminated by a light source,
 a spatial filter, which is aligned with respect to the diffractive layer, for delivering a filtered optical signal from the speckle pattern,
 a detector array for delivering, when illuminated by said filtered optical signal, an electrical signal,
 means for computing a cryptographic key from the electrical signal, and
 means for decrypting encrypted data contained in the information carrier from the cryptographic key.

As a consequence, the whole cryptographic structure, i.e. the diffractive layer, the spatial filter and the detector array, can be seen as one "chip", which gives a unique response to each incoming wave front. By rapidly varying the incoming wave front the uniqueness of a given diffractive structure can safely be identified.

According to a first embodiment of the invention, the diffractive structure, the spatial filter and the detector array are combined in one piece of hardware.

According to another embodiment of the invention, the detector is part of a read-out unit, the other parts of the cryptographic structure being combined in one piece of hardware.

According to another embodiment of the invention, the detector and the spatial filter are part of the read-out unit, while the diffractive structure is part of the content carrier. The spatial filer is then made of a reversible photosensitive material and is created every time a carrier is inserted into the read-out unit.

The present invention also relates to a method of manufacturing a cryptographic key, comprising the steps of:
 holographic exposing a layer of photopolymer for creating a diffractive structure,
 flood exposing said photopolymer layer to polymerize said diffractive structure,
 illuminating a first photosensitive material with a light source through the diffractive structure for forming a spatial filter having a predetermined pattern, an activation of said photosensitive material being performed when an intensity of a speckle pattern delivered by the diffractive structure for a given wave front of the light source is higher than a predetermined threshold.

Said method is adapted to make the diffractive structure, the spatial filter and possibly the detector array in a single step by optical illumination of photosensitive materials. This guarantees proper alignment of the detector, the spatial filter and the diffractive structure.

BRIEF DESCRIPTION OF THE DRAWINGS

The present invention will now be described in more detail, by way of example, with reference to the accompanying drawings, wherein.

DETAILED DESCRIPTION OF THE INVENTION

The present invention aims at proposing a cheap and efficient system for copy protection of an information carrier based on the diffraction principle. The information carrier is, for example, an optical disc, such as a Small Factor Format Optical SFFO disc or a Blu-ray disc, but it will be apparent to a person skilled in the art that the present invention is also applicable to other type of information carrier, such as, for example, magnetic disks or smart cards.

Figure 1:
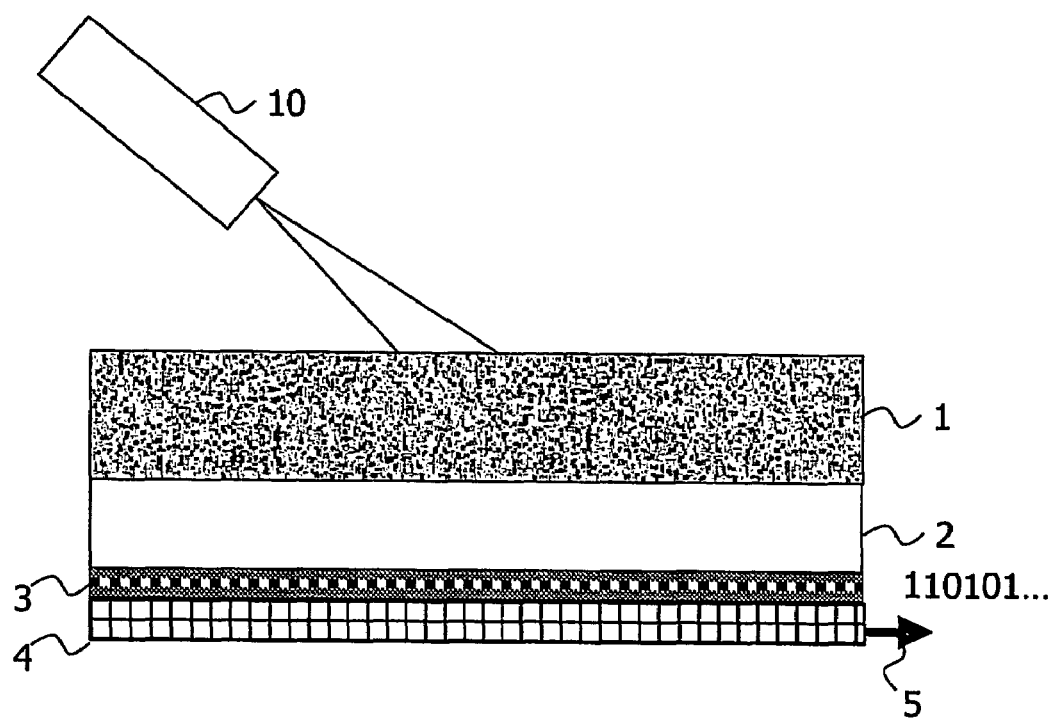
FIG. 1 is a schematic view of the cryptographic structure in accordance with the invention.
Figure 2:
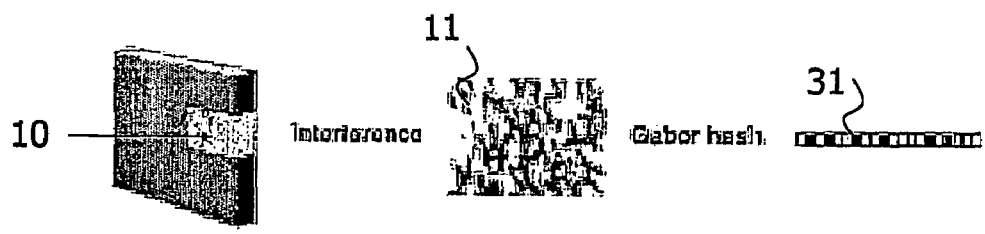
FIG. 2 illustrates the operating principle of the cryptographic structure in accordance with the invention.

FIG. 1 is a layout of an information carrier in accordance with the invention and FIG. 2 illustrates the operating principle of said information carrier. Such an information carrier comprises a diffractive layer 1 for delivering a speckle pattern 11 when illuminated by a light source 10, a spatial filter 3 for delivering a filtered optical signal 31 from the speckle pattern and a detector array 4 for delivering, when illuminated by said filtered optical signal, an electrical signal, from which a cryptographic key can be generated. It also comprises a spacer 2 for separating the diffractive layer from the spatial filter. This spacer plays a role of propagation medium. Its width is larger than the wavelength of the light source and smaller the width of the diffractive structure. These different structures are here combined in one piece of hardware.

The present invention proposes to make the diffractive layer and the spatial filter in a single step by optical illumination of photosensitive materials in order to guarantee a proper alignment of the spatial filter and the diffractive structure and an efficient operation of the cryptographic structure.

According to a first embodiment of the invention, the system in accordance with the invention comprises a simple detector array with large pixels. As a very sensitive system is required in order to detect if a hacker tries to clone the cryptographic key, it is necessary to compensate the poor performance of the detector array. This is done thanks to a very accurate spatial filter based on the use of one-way physical Gabor hash function for example.

The information layer in accordance with the invention gives a unique response to each incoming wave front emitted by a light source. Note that even when the responses from a large set of incoming wave fronts are known, this is not enough to predict the response to a wave front outside this set. As a consequence, a hacker cannot create a diffractive structure, which has, in combination with the spatial filter, the same signal on the detector.

As shown in FIG. 1, the cryptographic key is read out directly from the detector array. To this end, the system for copy protection further comprises a device for reading such an information carrier. Said device comprises means for computing a cryptographic key from the electrical signal delivered by the information layer, and means for decrypting encrypted data contained in the information carrier from the cryptographic key.

Such a device is consequently adapted to identify from the associated cryptographic structure the characteristic information present on the information carrier, to derive from it the cryptographic key, and to decrypt the user-information recorded on the information carrier. A recorder attempting to clone an original data carrier, i.e. to duplicate the user-information contained in an original data carrier, on a second data carrier will not be able to record onto the second data carrier also the characteristic information, like the one present on the original data carrier, necessary to decrypt the user-information. As a consequence the user-information contained in the second data carrier cannot be decrypted and played.

Security comes from the fact that there is a "one-way" relation between the diffractive layer and the cryptographic key. A security module is then able to verify the relation between the cryptographic key and the incoming wave front, thereby determining uniquely the identity of the structure.

The diffractive structure is made of photopolymers. They consist basically of one or more monomers or a combination of polymer and monomer, a binder functioning as an inactive component, and an initiation system. The medium is illuminated by a three-dimensional spatial pattern of high and low intensity. In the areas of high intensity, polymerization of the monomer is photo-initiated. Several mechanisms subsequently occur that cause a refractive index modulation consisting in changes that occur in the molecular electronic structure, density changes that occur upon polymerization, spatial segregation of the components within the system.

During a holographic exposure, spatial variations in polymerization rates induce spatial variations in monomer consumption. Due to this local depletion of the monomer and the additional shrinkage resulting from the polymerization, diffusion of monomer from the dark regions to the bright regions occurs. This process continues until the monomer is depleted completely in all regions or until the mobility is decreased, due to the increasing molecular weight of the system, to such an extent that monomer diffusion is halted. The spatial segregation of the various components results in refractive index differences when the refractive indices of both components vary significantly, and contributes to the overall refractive index modulation.

After the holographic exposure, the diffractive structure is illuminated with a flood exposure to fixate the structure by complete polymerization of any residual monomer. Hence, without component segregation, post-exposure illumination would result in a featureless, uniformly polymerized sample with no holographic activity.

The prediction of the result of the polymerization process is extremely difficult to determine. The diffusion constants of the individual components not only vary with polymerization time as a result of the changing viscosity of the environment, but also vary spatially, as a result of the spatial distribution of the light.

The non-linearity and unpredictability of the diffractive layer resulting from the polymerization process make it interesting for cryptography application, as it can not be predicted which diffractive structure is formed by a given illuminating wave front.

As the detector array has to be cheap and easy to manufacture, its lateral resolution is relatively poor. In order to compensate for that a spatial filter comprising a binary mask with very tiny holes is needed to enhance the lateral resolution significantly. The spatial filter has to be very well aligned laterally but also in the depth direction with respect to the diffractive structure. That is why the spatial filter is made or activated at the same step as the diffractive structure is fixed by flood-exposure.

This functionality can be provided by various materials, changing their optical properties from reflecting or absorbing to transparent upon strong irradiation. These materials are, for example, standard materials in optical storage, such as organic dyes, metal layer on organics, phase change materials, or suicides.

Alternatively, inorganic bi-layer materials proposed as resist can be used. These materials are selected from the group consisting of pairs: As—Pb, Bi—Cd, Bi—Co, Bi—In, Bi—Pb, Bi—Sn, Bi—Zn, Cd—In, Cd—Pb, Cd—Sb, Cd—Sn, Cd—Ti, Cd—Zn, Ga—In, Ga—Mg, Ga—Sn, Ga—Zn, In—Sn, In—Zn, Mg—Pb, Mg—Sn, Mg—Ti, Pb—Pd, Pb—Pt, Pb—Sb, Sb—Sn, Sb—Ti, Se—Ti, Sn—Ti, and Sn—Zn. For example, the bi-layers Bi—In or Bi—Sn can be used for their optical properties. Such a deposited bi-layer system is defined by high reflection and more or less "zero" transmission. After alloying initiated thermally or by intense light irradiation the bi-layer system appears to be transparent.

Figure 3:
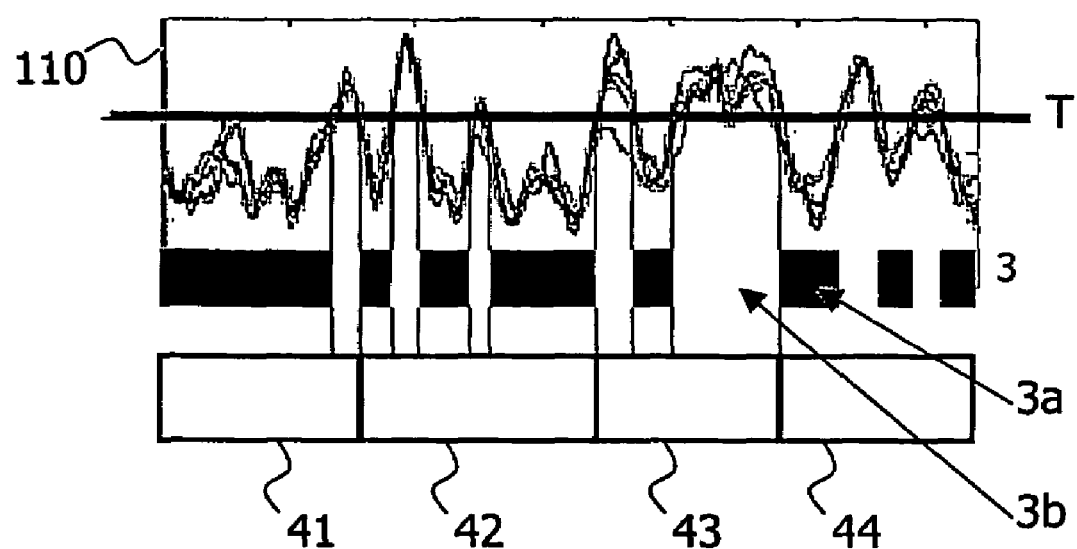
FIG. 3 illustrates the method of manufacturing a cryptographic key.

FIG. 3 illustrates the principle of structuring or "activating" the spatial filter properly. Under illumination by a light source, the diffractive structure provides a speckle pattern at a certain distance depending on the diffractive structure but also on the wave front of the light (wavelength, angle, divergence, phase, polarization). At these locations where the intensity 110 of the speckle pattern delivered by the diffractive structure for a given wave front of the light source reaches a certain threshold value materialized with the line T, the material is transformed becoming transparent. Below this threshold, the photosensitive material stays non-transparent. By this way a one-dimensional or two-dimensional binary mask comprising transparent parts 3$a$ and non-transparent parts 3$b$ is generated. Furthermore, this pattern is perfectly aligned with respect to the diffractive structure.

The choice of the proper detector is arbitrary for the working principle of the invention. However, it is preferred to use a relatively cheap approach, because the detector can be a part of the information carrier, such as for example copy protected optical disc produced in high volumes, and in large volume production low prices are an essential requirement. Said detector has large pixels 41 to 44 and consequently a resolution lower than the spatial filter.

It is therefore proposed to make use of a patterned photoelectric layer providing an electrical signal, which needs to be read out to get the optical cryptographic key. A combination, for example a correlation, of the electrical signal delivered by the photoelectric layer and of the optical signal delivered by the diffractive structure makes a unique optical cryptographic key, which gives access to the content of the information carrier, said content being encrypted with said key.

According to an embodiment of the invention, the photoelectric layer is patterned using a segmental activating or deactivating of said layer. Thanks to this segmentation the electrical signal corresponding to the predetermined pattern is generated when illuminated with an optical signal. The predetermined pattern can be written in the photoelectric layer, for example during manufacturing of the disc by patterned UV irradiation in an oxygen environment. This results in a locally high-ohmic behavior, which does not give rise to any current under illumination.

Alternatively, the electrodes could also be patterned. For instance, thin metal films on silicon could be used, acting as metallic electrodes. After a local heating or after an irradiation, silicides are formed. Said silicides are typically defined by high-ohmic or semi-conducting behavior.

According to another embodiment, the photoelectric internal layer is segmented in activated and deactivated areas and one electrode is segmented in segments.

The photoelectric layer is made of existing materials and stack combinations used in solar cells, for instance amorphous silicon as described by I. Garner in "Communications-International", vol. 16, no. 3 (1989) 73.

It can also be made of photoelectric tungsten disulfide $WS_2$ as described in "Solar Energy Materials & Solar Cells", by C. Balif, M. Regula, F. Levy, 57 (1999) 189, of copper, indium or gallium selenide, cadmium disulfide, cadmium diselenide, gallium arsenide, aluminum gallium arsenide.

The photoelectric layer can be made of organic solar cell materials based on conjugated polymer. It can be, for example, conjugated polymer/methanofullerene as described in "2.5% Efficient Organic Plastic Solar Cells", by S. E. Shaheen C. J. Brabec, N. S. Sariciftci, F. Padinger, T. Fromherz, J. C. Hummelen, Applied Physics Letters, vol. 78, no. 6 (2001) 841, or conjugated polymer/conjugated polymer, conjugated polymer/organic molecule, organic molecule/organic molecule, conjugated polymer/inorganic oxides, selenides and sulfides, organic molecule/inorganic oxides, selenides and sulfides.

The photoelectric layer can be based on carbon nanotubes as described by E. Kymanskis et al. Applied Physics Letters, vol. 80, no. 1 (2002) 112, or nanowires, preferably carbon nanotubes or metal oxide nanotubes.

The efficiency of these materials used as solar cells is relatively low due to the broad solar spectrum. However the invention is related to future generation of optical storage, which will make use of relative short wavelength, such as 405 nm for blu-ray disc, where quantum efficiency of up to 60% can be reached using proper dye materials.

It is to be noted that the diffractive layer, the spatial filter and the photodetector array can all be produced by photosensitive processes.

Therefore the whole structure can be developed in a single device, eliminating all alignment errors.

Alternatively, the detector is part of the read out unit, i.e. the detector is not directly part of the optical cryptographic structure. In that case, the essential parts of the cryptographic structure being the diffractive structure, the spacer and the spatial filter are combined in one piece of hardware and aligned precisely with respect to each other, whereas the detector, which is part of the reader, is a CCD or a CMOS detector for example.

An advantage of such a solution is a further cost reduction of the information carrier.

In a further embodiment, the detector and the spatial filter are part of the read out unit, while the diffractive structure is part of the information carrier. The spatial filter is thus created every time an information carrier is inserted into the read out unit. To this end, the spatial filter is made of a photosensitive reversible layer, such as for instance an AgCl/CuCl layer, which blackens under strong illumination and gets back to a transmission state in a dark environment. The diffractive structure on the information carrier is strongly illuminated, creating a gray-scale absorption pattern on the spatial filter. Subsequent illumination of the diffractive structure with a weak light source results in a diffraction pattern that is partly transmitted through the spatial filter onto the detector array. By changing parameters such as angle, wavelength, or position of the weak light source, a series of checks can be performed. It is to be noted that the proposed spatial filter returns to its initial transmission state after relatively short time.

The main advantage of this embodiment is the fact that the diffractive structure is the only part of the system present on the information carrier, the other parts being in the read out unit. This makes this embodiment very cheap. Still, the read out unit part and the information carrier part of the optical detection system are perfectly aligned just as they are in the embodiments described above. Furthermore, by producing the read out unit part of the optical detection system on one chip, no signal can be monitored.

In addition, the patterning of the spatial filter and the cryptographic optical key read out procedure can either be performed on a moving, for example rotating, or a stationary information carrier.

Any reference sign in the following claims should not be construed as limiting the claim. It will be obvious that the use of the verb "to comprise" and its conjugations do not exclude the presence of any other steps or elements besides those defined in any claim. The word "a" or "an" preceding an element or step does not exclude the presence of a plurality of such elements or steps.

The invention claimed is:

1. An information carrier comprising: a diffractive layer made of photopolymers, for delivering a speckle pattern when illuminated by a light source, a spatial filtering layer including a binary mask made of a photosensitive material, for delivering a filtered optical signal from the speckle pattern, said spatial filtering layer being aligned with respect to the diffractive layer, and a detection layer for transforming said filtered optical signal into an electrical signal, from which a cryptographic key is generated.

2. An information carrier as claimed in claim 1, wherein the detection layer is made of a patterned photoelectric material.

3. An information carrier as claimed in claim 1, further comprising a spacer for separating the diffractive layer from the spatial filtering layer, said spacer having a width which is larger than the wavelength of the light source and smaller than the width of the diffractive layer.

4. A device for reading an information carrier as claimed in claim 1, said device comprising: means for computing a cryptographic key from the electrical signal delivered by the detection layer, and means for decrypting encrypted data contained in the information carrier based on the cryptographic key.

5. An information carrier comprising: a diffractive layer made of photopolymers, for delivering a speckle pattern when directly illuminated by a light source, and a spatial filtering layer including a binary mask made of a photosensitive material, for delivering a filtered optical signal from the speckle pattern, said spatial filtering layer being aligned with respect to the diffractive layer.

6. An information carrier as claimed in claim 5, further comprising a spacer for separating the diffractive layer from the spatial filtering layer, said spacer having a width which is larger than the wavelength of the light source and smaller than the width of the diffractive layer.

7. A device for reading an information carrier as claimed in claim 5, said device comprising: a detector array for transforming the filtered optical signal into an electrical signal, means for computing a cryptographic key from said electrical signal, and means for decrypting encrypted data contained in the information carrier from the cryptographic key.

8. A device as claimed in claim 1, wherein the detector array is made of a patterned photoelectric material.

9. A device for reading an information carrier comprising a diffractive layer for delivering a speckle pattern when directly illuminated by a light source, said device comprising: a spatial filter for delivering a filtered optical signal from the speckle pattern, said spatial filter including a binary mask made of a reversible photosensitive material such that said binary mask is created every time an information carrier is inserted into said device, a detector array for transforming the filtered optical signal into an electrical signal, means for computing a cryptographic key from said electrical signal, and means for decrypting encrypted data contained in the information carrier from the cryptographic key.

10. A method of manufacturing an information carrier as claimed in claim 1, said method comprising the steps of: holographic exposing a layer of photopolymer so as to create a diffractive structure, illuminating at the same time said photopolymer layer so as to polymerize said diffractive structure, and a layer made of photosensitive material through the diffractive structure so as to form a spatial filter having a binary mask including activated and non-activated areas, an activation of said photosensitive material being performed when an intensity of a speckle pattern delivered by the diffractive structure for a given wave front of the light source is higher than a predetermined threshold.

* * * * *